United States Patent
Yu et al.

(10) Patent No.: US 11,250,282 B2
(45) Date of Patent: Feb. 15, 2022

(54) FACE SPOOFING DETECTION USING A PHYSICAL-CUE-GUIDED MULTI-SOURCE MULTI-CHANNEL FRAMEWORK

(71) Applicant: NEC Laboratories America, Inc., Princeton, NJ (US)

(72) Inventors: Xiang Yu, Mountain View, CA (US); Buyu Liu, Cupertino, CA (US); Manmohan Chandraker, Santa Clara, CA (US); Junru Wu, College Station, TX (US)

(73) Assignee: NEC Corporation

( * ) Notice: Subject to any disclaimer, the term of this patent is extended or adjusted under 35 U.S.C. 154(b) by 0 days.

(21) Appl. No.: 17/091,140

(22) Filed: Nov. 6, 2020

(65) Prior Publication Data
US 2021/0150240 A1   May 20, 2021

Related U.S. Application Data

(60) Provisional application No. 62/935,155, filed on Nov. 14, 2019.

(51) Int. Cl.
*G06K 9/00* (2006.01)
*G06N 3/04* (2006.01)

(52) U.S. Cl.
CPC ..... *G06K 9/00906* (2013.01); *G06K 9/00275* (2013.01); *G06K 9/00295* (2013.01); *G06K 9/00302* (2013.01); *G06N 3/04* (2013.01)

(58) Field of Classification Search
CPC .......... G06K 9/00906; G06K 9/00302; G06K 9/00275; G06K 9/00295; G06K 9/6271; G06K 9/00926; G06K 9/00281; G06K 9/6256; G06K 9/6215; G06K 9/00288; G06K 9/00268; G06K 9/6277; G06K 2009/00932; G06K 9/00026; G06K 9/6255; G06K 9/00577; G06K 9/00892; G06K 9/00979; G06K 9/627; G06K 2009/00738; G06K 9/00006; G06K 9/00617;
(Continued)

(56) References Cited

U.S. PATENT DOCUMENTS 10,970,629 B1 *   4/2021   Dirac .................. G06N 3/04
2021/0082136 A1 *   3/2021   Nikitidis .............. G06K 9/6256

OTHER PUBLICATIONS

Yang et al., "Face Anti-Spoofing: Model Matters, So Does Data", Tencent AI Lab, Jun. 2019, pp. 1-10.
(Continued)

*Primary Examiner* — Nimesh Patel
(74) *Attorney, Agent, or Firm* — Joseph Kolodka

(57) ABSTRACT

A computer-implemented method for implementing face spoofing detection using a physical-cue-guided multi-source multi-channel framework includes receiving a set of data including face recognition data, liveness data and material data associated with at least one face image, obtaining a shared feature from the set of data using a backbone neural network structure, performing, based on the shared feature, a pretext task corresponding to face recognition, a first proxy task corresponding to depth estimation, a liveness detection task, and a second proxy task corresponding to material prediction, and aggregating outputs of the pretext task, the first proxy task, the liveness detection task and the second proxy task using an attention mechanism to boost face spoofing detection performance.

17 Claims, 4 Drawing Sheets

(58) Field of Classification Search
CPC ........... G06K 9/00711; G06K 9/00771; G06K 9/00087; G06K 9/00335; G06K 9/00369; G06K 9/00718; G06K 9/3233; G06K 9/6218; G06K 9/6262; G06N 3/04; G06F 21/32; G06F 21/31; G06F 21/6245; G06F 2221/2113; G06F 2221/2149; G06F 21/606; H04L 12/282; H04L 63/0853; H04L 63/0861; H04L 41/28; H04L 63/00; H04L 63/0407; H04L 9/3231; H04L 2463/082; H04L 63/105; H04L 63/107; H04W 12/06; H04W 12/68; H04W 12/068; H04W 12/80; H04W 4/021; H04W 4/029; H04W 4/90

See application file for complete search history.

(56) References Cited

OTHER PUBLICATIONS

Liu et al., "Learning Deep Models for Face Anti-Spoofing: Binary or Auxiliary Supervision", Department of Computer Science and Engineering Michigan State University, Mar. 2018, pp. 1-10.

Liu et al., "Deep Tree Learning for Zero-shot Face Anti-Spoofing", Department of Computer Science and Engineering Michigan State University, Apr. 2019, pp. 1-10.

Atoum et al., "Face Anti-Spoofing Using Patch and Depth-Based CNNs", Department of Computer Science and Engineering Michigan State University, Feb. 2018, pp. 1-10.

\* cited by examiner

400

Receive a set of data including face recognition data, liveness data and material data associated with at least one face image
410

Obtain a shared feature from the set of data using a backbone neural network structure
420

Perform, based on the shared feature, a pretext task corresponding to face recognition, a first proxy task corresponding to depth estimation, a liveness detection task, and a second proxy task corresponding to material prediction
430

Aggregate outputs of the pretext task, the first proxy task, the liveness detection task and the second proxy task using an attention mechanism to boost face spoofing detection performance
440

FIG. 4

A page from US 11,250,282 B2

FACE SPOOFING DETECTION USING A PHYSICAL-CUE-GUIDED MULTI-SOURCE MULTI-CHANNEL FRAMEWORK

RELATED APPLICATION INFORMATION

This application claims priority to provisional application Ser. No. 62/935,155, filed on Nov. 14, 2019, incorporated by reference herein in its entirety.

BACKGROUND

Technical Field

The present invention relates to artificial intelligence and machine learning, and more particularly to face spoofing detection using a physical-cue-guided multi-source multi-channel framework.

Description of the Related Art

Face recognition technology can be used to implement biometric-based systems that implement security monitoring, access control, personal authentication, etc. Such systems can be vulnerable to static or dynamic face spoofing attacks, which can use photographs, screen replay, face reconstruction, etc. to trick the systems into identifying a face as a genuine face. Face anti-spoofing measures can be enacted to combat such face spoofing attacks by discriminating genuine faces from fake faces of the face spoofing attacks. One example of a face anti-spoofing measure is as liveness check, which can be used to discern between a real face image and a spoofed face image (e.g., photo). One challenge with combating the face spoofing problem is that there may be very subtle differences between a real image and a spoofed image as the re-capturing from display or printed photos can be very high quality. Another challenge with combating the face spoofing problem is that spoofing attack patterns are always innumerable and thus it is difficult to prepare for all them during model training. For example, restricting training on one dataset results in a model that cannot adequately generalize to other datasets or other face spoofing scenarios.

SUMMARY

According to an aspect of the present invention, a computer-implemented method is provided for implementing face spoofing detection using a physical-cue-guided multi-source multi-channel framework. The computer-implemented method includes receiving a set of data including face recognition data, liveness data and material data associated with at least one face image, obtaining a shared feature from the set of data using a backbone neural network structure, performing, based on the shared feature, a pretext task corresponding to face recognition, a first proxy task corresponding to depth estimation, a liveness detection task, and a second proxy task corresponding to material prediction, and aggregating outputs of the pretext task, the first proxy task, the liveness detection task and the second proxy task using an attention mechanism to boost face spoofing detection performance.

According to another aspect of the present invention, a system is provided for implementing face spoofing detection using a physical-cue-guided multi-source multi-channel framework. The system includes a memory device storing program code and at least one processor device operatively coupled to the memory device. The at least one processor device is configured to execute program code stored on the memory device to receive a set of data including face recognition data, liveness data and material data associated with at least one face image, obtain a shared feature from the set of data using a backbone neural network structure, perform, based on the shared feature, a pretext task corresponding to face recognition, a first proxy task corresponding to depth estimation, a liveness detection task, and a second proxy task corresponding to material prediction, and aggregate outputs of the pretext task, the first proxy task, the liveness detection task and the second proxy task using an attention mechanism to boost face spoofing detection performance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a block/flow diagram illustrating a system/method for implementing face spoofing detection using a physical-cue-guided multi-source multi-channel framework, in accordance with an embodiment of the present invention.

DETAILED DESCRIPTION OF PREFERRED EMBODIMENTS

Figure 1:
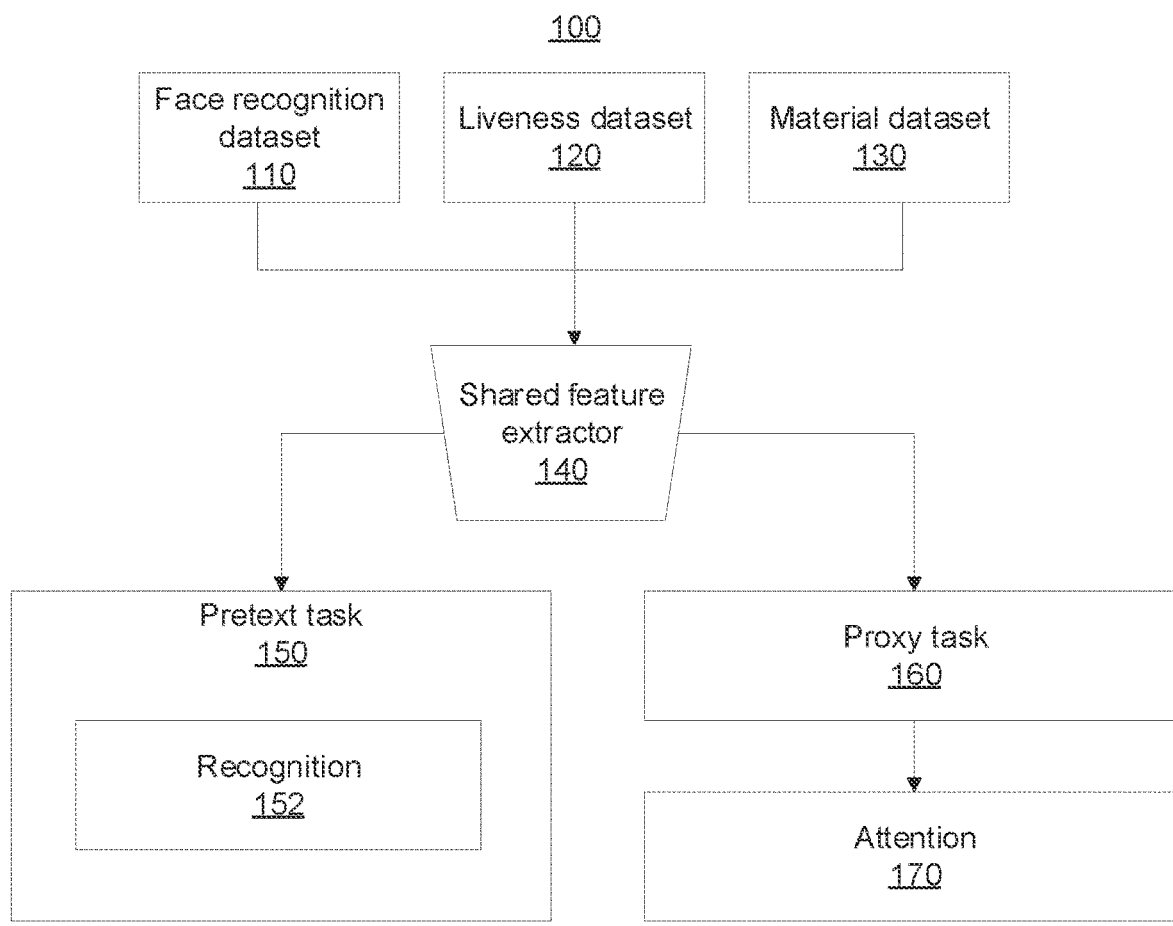
FIG. 1 is a block/flow diagram illustrating a physical-cue-guided multi-source multi-channel framework for implementing face spoofing detection, in accordance with an embodiment of the present invention.

In accordance with embodiments of the present invention, systems and methods are provided for physical based multitasking for cross-domain generalization in face anti-spoofing. More specifically, the embodiments described herein provide for a multi-channel framework within a single source domain to conduct multiple tasks in parallel. For example, the tasks can include a pretext task corresponding to face recognition, and a first proxy task corresponding to depth estimation, a liveness detection task, and a second proxy task corresponding to material recognition. A pretext task seeks a general feature representation that is generalizable to other face analysis tasks such as spoofing detection. A proxy task is a liveness correlated task that can determine performance. More specifically, a proxy task corresponds to a physical cue such as, e.g., depth and/or material, that shared similar characteristics across all genuine faces under seen or unseen circumstances. For example, the skin material from seen or unseen situations should present the same properties as skin, and the depth of a genuine face from seen or unseen condition should present consistent face geometry. Accordingly, the proxy tasks described herein guide face spoofing detection training in a physically meaningful and robust way.

The embodiments described herein further provide an online attention component built on top of the proxy task(s) to better highlight each channel under different spoofing attacks and smooth the training procedure, and thus increase the robustness and interpretation of each channel of the multi-channel framework.

The embodiments described herein can thus achieve good performance on a single source domain. Additionally, by setting up proxy tasks, which are mostly domain consistent cues, the embodiments described herein can further support good performance on the other unseen domains. For example, depth is a relatively independent cue to indicate the geometric information of a face, which is domain irrelevant. Skin material (e.g., human skin material) could also be considered domain irrelevant as skin material across different domains should be the same.

Ultimately, the embodiments described herein introduce a proxy channel-wise attention model to jointly consider the advantage of each of the proxy tasks and combine them at the logit output level to further boost the overall spoofing detection performance. Accordingly, the embodiments described herein enable improved performance in the source domain and the unseen domain compared to baselines of single channel liveness detection and depth estimation.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now in detail to the figures in which like numerals represent the same or similar elements and initially to FIG. 1, a high-level diagram is provided illustrating an exemplary physical-cue-guided multi-source multi-channel framework 100 for implementing face spoofing detection. More specifically, the framework 100 includes a multi-task cross-domain generalization liveness detection model. As will be described in further detail below, the framework 100 is configured to improve face spoofing detection performance by leveraging face recognition data, liveness data and material data.

As shown, a face recognition dataset 110, a liveness dataset 120 and a material dataset 130 are fed into a shared feature extractor 140. In one embodiment, the material dataset 130 is a Materials in Context (MINC) dataset. The liveness dataset 120 can include depth ground truth and material ground truth prepared off-line.

The shared feature extractor 140, which is more generally referred to herein as a type of backbone neural network structure, extracts a shared feature from the datasets 110-130, and feeds the shared feature to a pretext task component 150 configured to perform at least one pretext task (face recognition) and a proxy task component 160 configured to perform at least two proxy tasks (depth estimation and/or material recognition), and a liveness detection task. The shared feature is used by the pretext and proxy components 150 and 160 to enhance model generalization ability across different data domains by sharing depth and material tasks.

As shown, the pretext task component 150 includes a recognition component 152 configured to receive data from the shared feature extractor 140 and generate an identity 204. More specifically, let $\Phi(\cdot)$ correspond to the shared feature extractor 140, and $x_r$, $x_v$ and $x_m$ correspond to input images of the face recognition dataset 110, the liveness dataset 120 and the material dataset 130, respectively. After the shared feature extractor 140 is initialized, the pretext task component 150 can apply a filter $\Psi_r(\cdot)$ to refine the face identity feature. A face recognition loss, $L_r$, can then be obtained as $$L_r = -\sum_i \mathbb{1}(y_i)\log\left(\frac{\exp(w_i\Psi_r(\Phi(x_r)))}{\sum_j \exp(w_j\Psi_r(\Phi(x_r)))}\right) \quad (1)$$

Where $y_i$ is the ground truth label for the identity i, $\mathbb{1}$ represents the indication function (e.g., if $y_i$ is non-zero it outputs 1, otherwise it outputs 0), j varies across the whole number of identities, and $w_i$ is the i-th separation hyperplane of the classifier.

As further shown, the proxy task component 160 is configured to receive data from the shared feature extractor 140, and an output of the proxy task component 160 is fed into an attention mechanism 170 configured to aggregate each of the proxy channels output by the proxy task component 160. More specifically, the attention mechanism 170 is an online attention component built on top of the proxy tasks to better highly each channel under different spoofing attacks and smooth the training procedure, and thus increase the robustness and interpretation of each channel of the multi-channel framework. Further details regarding the proxy task component 160 and the attention mechanism 170 will now be described below with reference to FIG. 2.

Figure 2:
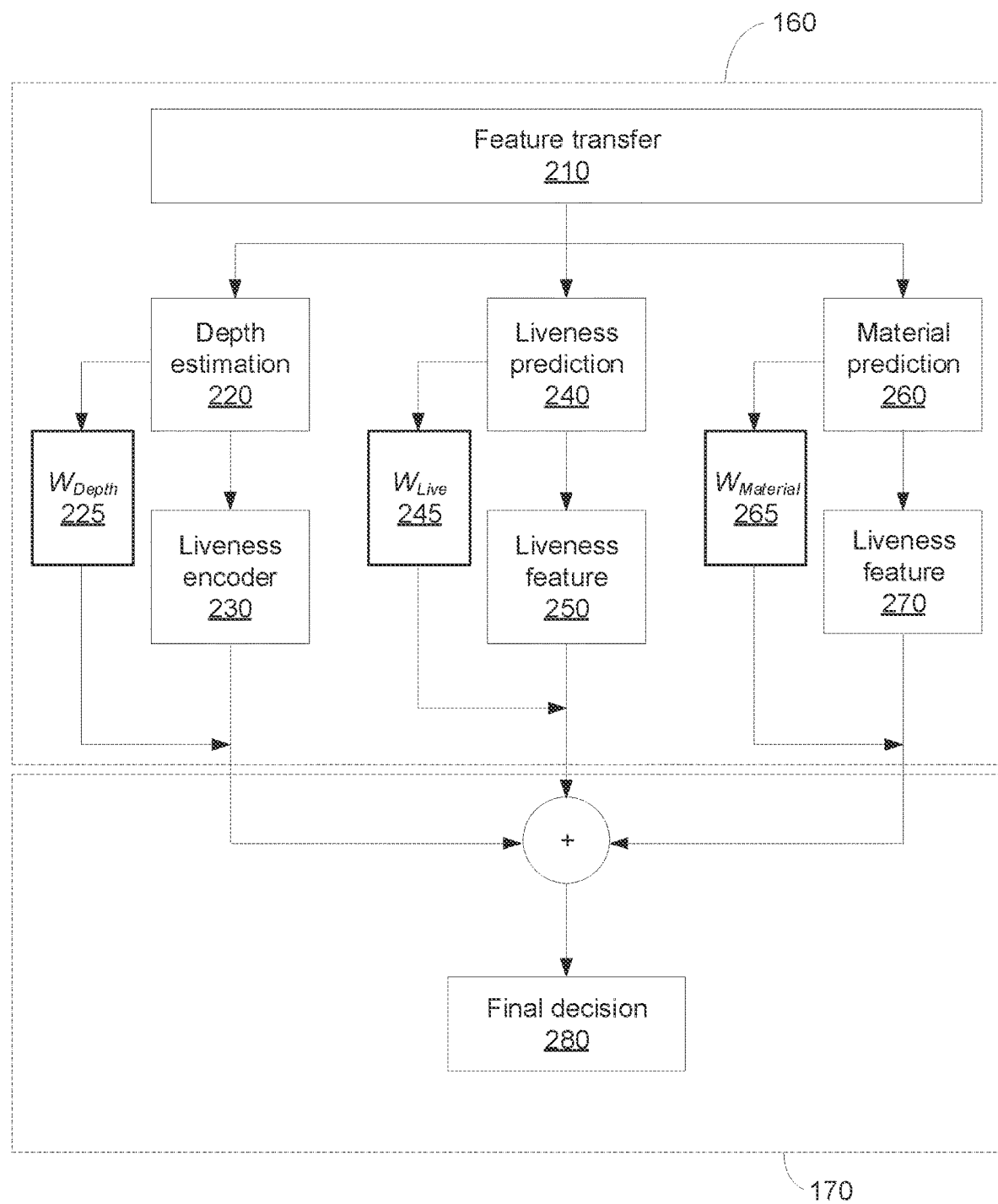
FIG. 2 is a block/flow diagram illustrating an exemplary proxy task component and an attention component of the framework of FIG. 1, in accordance with an embodiment of the present invention.

Referring now to FIG. 2, a block/flow diagram is provided illustrating a face spoofing detection system 200. The system includes the proxy task component 160 and the attention mechanism 170 of FIG. 1. It is assumed that the proxy task component 160 has received a shared feature from the shared feature extractor 140.

The proxy task component 160 includes a feature transfer component 210, a depth estimation component 220, a liveness encoder 230, a liveness prediction component 240, a liveness feature 250, a material prediction component 260, and a material converted liveness feature 270 converted from the liveness feature 250.

Directly utilizing the shared feature leads to sub-optimal prediction as it incorporates unrelated cues such as face recognition, which can serve as noise. Thus, the feature transfer component 210 is configured to receive the shared feature from the shared feature extractor 140 and adapt the shared feature into a plurality of spoofing detection related proxy tasks.

The components of FIG. 2 correspond to multiple channels for the proxy tasks performed by the proxy task component 160. More specifically, the depth estimation component 220 and the liveness encoder 230 are configured to perform a depth estimation proxy task to generate a depth prediction together with a depth channel attention matrix $W_{Depth}$ 225, the liveness prediction component 240 is configured to perform a liveness prediction task to generate the liveness feature 250 and a corresponding liveness channel attention matrix $W_{Live}$ 245, and the material prediction component 260 is configured to perform a material prediction task to generate the material converted liveness feature 270 and a corresponding material channel attention matrix $W_{Material}$ 265.

With respect to the depth estimation, an assumption is that those genuine faces across different attack types or spoofing datasets should share consistency and thus the depth estimation should also be consistent. The aim is to predict a per-pixel depth map given an input face image (e.g., cropped face image). For example, an hourly glass network structure can be leveraged to conduct the regression problem. To predict a ground truth depth map, a three-dimensional face shape reconstruction process can be applied off-line to estimate the dense point cloud for the face images. Then, for genuine face images, the raw depth can be utilized as the ground truth depth map. For spoofing face images, according to attack types (e.g., display screen or paper), the actual depth is from a flat zone of the attack type. Thus, the spoofing ground truth relative to depth can be set to zero. During training, the following $l_1$-based reconstruction loss $L_d$ can be applied:

$$L_d = \|\Psi_d(\Gamma(\Phi(x_v))) - d_{GT}\| \quad (2)$$

where $\Psi_d(\cdot)$ represents the (hourly glass net) depth estimation component 220, $\Gamma(\cdot)$ represents the feature transfer component 210, $x_v$ represents the spoofing data as described above with reference to FIG. 1, and $d_{GT}$ represents the ground truth depth map. Note that for depth estimation, the spoofing data $x_v$ is input with the augmented ground truth depth map $d_{GT}$. That is, extra depth data need not be utilized for this depth estimation channel.

After the shared feature extractor 140 and the feature transfer component 210, a spoofing detection filter $\Psi_v(\cdot)$ is set up to conduct face spoofing detection. More specifically, the face spoofing detection can be conducted as a binary classification task, in which a cross-entropy loss, $L_v$, can be adopted as the penalty as follows:

$$L_v = -(y_v)\log(p(z)) - (1-y_v)\log(1-p(z)) \quad (3)$$

$$p(z) = \frac{\exp(\tilde{w}_0 z)}{\exp(\tilde{w}_0 z) + \exp(\tilde{w}_1 z)} \quad (4)$$

$$z = \Psi_v(\Gamma(\Phi(x_v))) \quad (5)$$

where $y_v$ is the ground truth of spoofing or genuine, z denotes the spoofing detection feature after the spoofing detection filter $\Psi_v(\cdot)$, $\tilde{w}_0$ and $\tilde{w}_1$ denote the separation hyperplanes of the binary classifier, and p(z) is the likelihood of being a spoofing sample, which as shown in equation (4) can be estimated via a softmax operation.

Another assumption for the proxy tasks is that the skin material across different spoofing attacks or spoofing datasets should preserve certain consistency for the genuine faces. Thus, the face spoofing data can be annotated with a material type according to its attack type. For instance, if the attack type is screen display, the corresponding material type annotation can be "glass" and the attack type is a paper printout, the corresponding material type annotation can be "paper." For genuine faces, the corresponding material type annotation can be "skin." In this way, material type can be unified towards the general material recognition.

In this illustrative example, there are only three material types. This can lead to sensitivity issues similar to those found in the binary spoofing detection task. To improve the material recognition robustness, general material recognition data can be introduced to anchor the material feature space from being collapsed. More specifically, the general material recognition and spoofing data material recognition can share all of the network structures except for the last classifier. As in general material recognition, there can be about 23 defined categories, such as brick, metal, plastic, skin, glass, etc. Thus, a 23-way classifier $C_g$ for the general material recognition and a 3-way classifier $C_v$ for spoofing data material recognition can be set up.

A multi-source scheme is proposed herein to jointly train the shared feature extractor 140, $\Phi(\cdot)$, the feature transfer component 210, $\Gamma(\cdot)$, and the material prediction component 250, $\Psi_m(\cdot)$. For example, by feeding general material data, denoting the feature $f=\Psi_m(\Gamma(\Phi)(x)))$, a multi-class softmax loss can be applied to train $C_g$ as follows:

$$L_m = -\sum_{i=1}^{23} \mathbb{1}(l_i)\log\left(\frac{\exp(w_i\Psi_m(\Gamma(\Phi(x_m))))}{\sum_j \exp(w_j\Psi_m(\Gamma(\Phi(x_m))))}\right) \quad (6)$$

where $l_i$ is the material ground truth label, and $w_i$ and $w_j$ are the separation hyper-planes of $C_g$. By feeding the spoofing data, we can force the learning loop through the other 3-way classifier $C_v$ with another multi-class softmax loss as follows:

$$L_{mv} = -\sum_{i=1}^{3} \mathbb{1}(l_i)\log\left(\frac{\exp(\tilde{w}_i\Psi_m(\Gamma(\Phi(x_v))))}{\sum_j \exp(\tilde{w}_j\Psi_m(\Gamma(\Phi(x_v))))}\right). \quad (7)$$

It is noted that the material data input from Equation 6, $x_m$, is switched to the spoofing data input, $x_v$, in Equation 7. By alternatively feeding the material and spoofing data, we can ensure that the feature f is not only general for the standard material recognition, but also specific for the material recognition in face spoofing data.

Turning to the attention mechanism 170, as further shown in FIG. 2, the attention mechanism 170 includes a final decision component 260 configured to receive the channel outputs $W_{Depth}$, $W_{Live}$ and $W_{Material}$ and combine each of these outputs to boost the final spoofing prediction performance. More specifically, a prediction-level attention model is used to aggregate the outputs.

For example, denote the output of the depth channel as $D \in \mathbb{R}^{100 \times 100}$, the output of the spoofing detection channel as $g_v \in \mathbb{R}^{2 \times 1}$, and the output of the material recognition channel as $\tilde{g}_m \in \mathbb{R}^{3 \times 1}$. We need to convert D and $\tilde{g}_m$ into the binary spoofing logits (one for the likelihood of being a spoof and one or the likelihood of being genuine. For depth, through a validation set, we can empirically search a threshold $\tau \in \mathbb{R}^{4 \times 4}$ to measure the depth map activation significance as follows:

$$g_d^1 = \frac{\exp(\sum \text{sgn}(R) \odot R)}{\exp(\sum \text{sgn}(R) \odot R) + \exp(\sum \text{sgn}(-R) \odot (-R))} \quad (8)$$

where $g_d^1$ is the likelihood for being a spoofed face, $R = (\text{MaxPool}(D) - \tau) \in \mathbb{R}^{4 \times 4}$ is the residual depth map after thresholding by $\tau$ and $\text{MaxPool}(\cdot)$ is the max-pooling operation. The overall transferred binary depth logits is $g_d = [g_d^1, 1-g_d^1]$, where $1-g_d^1$ is the likelihood of not being a spoofed face (i.e., being a genuine face).

To convert the 3-way material logits to binary spoofing logits, we can take the skin likelihood as one logit for the genuine face and the summation of glass and paper likelihoods as another logit for the spoofed face. That is, $g_m = [\tilde{g}_m^{skin}, \tilde{g}_m^{glass}+[\tilde{g}_m^{paper}]$, where the original 3-way material logits are denoted by $\tilde{g}_m = [\tilde{g}_m^{skin}, \tilde{g}_m^{glass}+[\tilde{g}_m^{paper}]$.

Putting the three channels' binary logits together, we obtain an output $G = [g_d, g_v, g_m] \in \mathbb{R}^{2 \times 3}$. An attentional weighting matrix $W \in \mathbb{R}^{3 \times 2}$ can be introduced to aggregate the logits from the three channels. Thus, the fused prediction logits can be denoted as $$g = \text{diag}(GW) \quad (9).$$

Similar to the spoofing detection channel, a cross-entropy loss can be applied on the attention gated logits as follows:

$$L_a = -(y_v)\log(p(g)) - (1-y_v)\log(1-p(g)) \quad (10)$$

$$p(g) = \frac{\exp(g_0)}{\exp(g_0) + \exp(g_1)} \quad (11)$$

where $g_0$ and $g_1$ are two entries of g.

The overall loss design can be combined as follows:

$$L = \lambda_r L_r + \lambda_d L_d + \lambda_v L_v + \lambda_m L_m \lambda_{mv} L_{mv} + \lambda_a L_a \quad (12)$$

where $\lambda_r$, $\lambda_d$, $\lambda_v$, $\lambda_m$, $\lambda_{mv}$ and $\lambda_a$ are hyperparameters corresponding to respective ones of the losses $L_r$, $L_d$, $L_v$, $L_m$, $L_{mv}$ and $L_a$ described above.

In summary, the embodiments described herein provide for a physical-cue-guided multi-source multi-channel framework which takes face recognition data, spoofing data and material data as input for training a model used to detect unseen spoofing attack types. To prevent features from collapsing or overfitting, a pretext channel for face recognition is provided, where recognition and spoofing detection can share high-level face related characteristics. Due to the consistency of depth and skin material across different spoofing scenarios for genuine faces, by harnessing two proxy channels for depth estimation and material recognition, respectively, the embodiments described herein can deal with unseen spoofing attacks by discriminating the genuine faces through depth and material from the spoof faces. An attention component is provided to aggregate outputs of the tasks performed by the multiple channels to boost face spoofing detection performance.

The face recognition model trained in accordance with the embodiments described above with reference to FIGS. 1 and 2 can be implemented to perform face spoofing detection within any suitable system or context.

Figure 3:
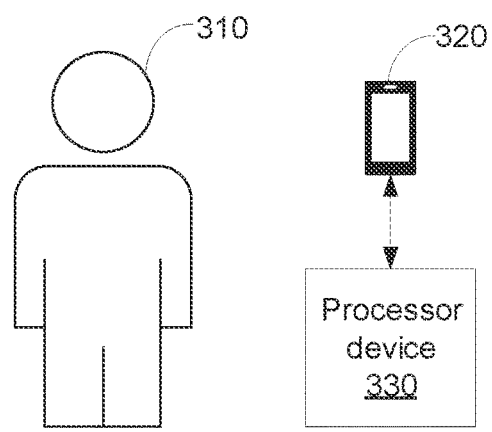
FIG. 3 is a block/flow diagram illustrating an exemplary system environment for implementing face spoofing detection using a physical-cue-guided multi-source multi-channel framework, in accordance with an embodiment of the present invention.

For example, referring now to FIG. 3, an exemplary environment 300 for implementing face spoofing detection is shown. More specifically, the environment 300 includes a user 310 and a computing system or device 320. The computing system 320 can implement a biometric system that grants or denies the user 310 access to the computing system 320 based on an analysis of the face of the user 310. For example, in this illustrative embodiment, the computing system 320 is a smartphone that includes a camera. This embodiment is purely exemplary, and the face spoofing detection model can be used within any suitable environment.

As further shown, the environment 300 can further include at least one processor device 330. The processor device 330 can be configured to implement the system/method described herein for implementing face spoofing detection. Although the processing device 330 is shown as being a separate entity from the computing system 320, the processor device 300 can alternatively be a subcomponent of the computer system 320, or the computer system 320 can be a subcomponent of the processor device 330.

Referring now to FIG. 4, a block/flow diagram is provided illustrating a system/method 400 for implementing face spoofing detection using a physical-cue-guided multi-source multi-channel framework.

At block 410, a set of data including face recognition data, liveness data and material data associated with at least one face image is received. In one embodiment, the material data includes a Materials in Context (MINC) dataset. The liveness data can include depth ground truth and material ground truth prepared off-line.

At block 420, a shared feature is obtained from the set of data using a backbone neural network structure. More specifically, the backbone neural network structure can include a shared feature extractor, and obtaining the shared feature can include extracting the shared feature using the shared feature extractor.

At block 430, a pretext task corresponding to face recognition, a first proxy task corresponding to depth estimation, a liveness detection task and a second proxy task corresponding to material prediction are performed based on the shared feature. More specifically, first and second proxy tasks are spoofing detection related proxy tasks. In one embodiment, the first proxy task generates a depth prediction together with a depth channel attention matrix, the liveness prediction task generates a liveness feature and a corresponding liveness channel attention matrix, and the material prediction task generates a liveness feature and a corresponding material channel attention matrix. The depth prediction predicts a per-pixel depth map given an input face image (e.g., cropped face image).

At block 440, outputs of the pretext task, the first proxy task, the liveness detection task and the second proxy task are aggregated using an attention mechanism to boost face spoofing detection performance. More specifically, the attention mechanism can be built on top of the first and second proxy tasks to better highlight each channel under different spoofing attacks and smooth the training procedure, and thus increase the robustness and interpretation of each channel in the multi-channel framework. In one embodiment, aggregating the outputs includes combining the depth channel attention matrix, the liveness channel attention matrix and the material channel attention matrix using a prediction-level attention model.

The face spoofing detection can implement an overall loss design including a face recognition loss, an $l_1$-based reconstruction loss, at least one cross-entropy loss and at least one multi-class softmax loss. More specifically, the at least one cross-entropy loss can include a first cross-entropy loss corresponding to a penalty adopted while conducting the face spoofing detection and a second cross-entropy loss applied on attention gated logits, and the at least one multi-class softmax loss can include a first multi-class softmax loss applied to train a 23-way classifier for general material recognition and a second multi-class softmax loss applied to train a 3-way classifier for spoofing data material recognition.

Further details regarding blocks 410-440 are described above with reference to FIGS. 1 and 2.

Figure 5:
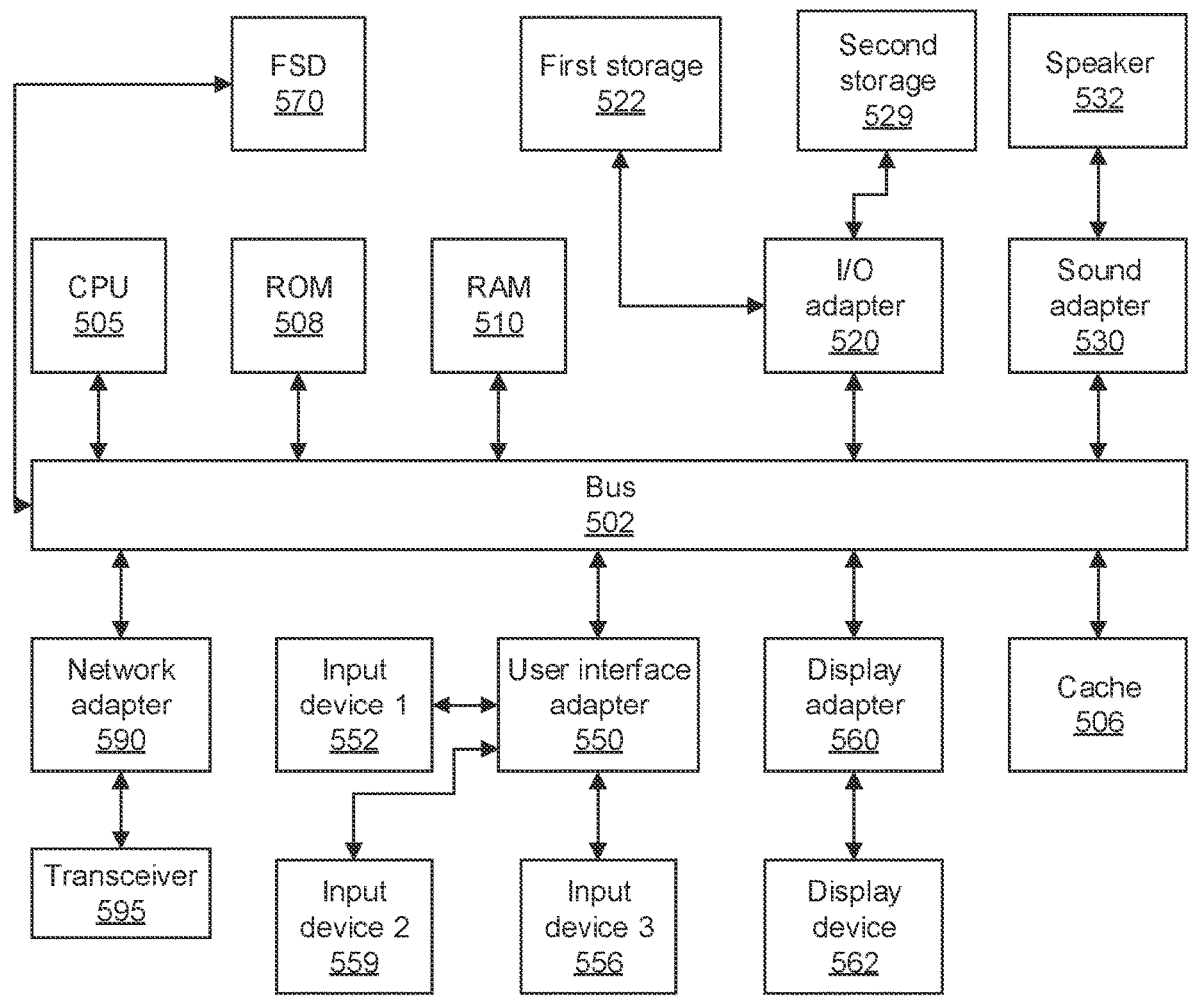
FIG. 5 is a block/flow diagram illustrating a computer system, in accordance with an embodiment the present invention.

Referring now to FIG. 5, an exemplary computer system 500 is shown which may represent a server or a network device, in accordance with an embodiment of the present invention. The computer system 500 includes at least one processor (CPU) 505 operatively coupled to other components via a system bus 502. A cache 506, a Read Only Memory (ROM) 508, a Random-Access Memory (RAM) 510, an input/output (I/O) adapter 620, a sound adapter 530, a network adapter 590, a user interface adapter 550, and a display adapter 560, are operatively coupled to the system bus 502.

A first storage device 522 and a second storage device 529 are operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices.

A speaker 532 may be operatively coupled to system bus 502 by the sound adapter 530. A transceiver 595 is operatively coupled to system bus 502 by network adapter 590. A display device 562 is operatively coupled to system bus 502 by display adapter 560.

A first user input device 552, a second user input device 559, and a third user input device 556 are operatively coupled to system bus 502 by user interface adapter 550. The user input devices 552, 559, and 556 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 552, 559, and 556 can be the same type of user input device or different types of user input devices. The user input devices 552, 559, and 556 are used to input and output information to and from system 500.

Face spoofing detection (FSD) component 570 may be operatively coupled to system bus 502. FSD component 570 is configured to perform one or more of the operations described above. FSD component 570 can be implemented as a standalone special purpose hardware device, or may be implemented as software stored on a storage device. In the embodiment in which FSD component 570 is software-implemented, although shown as a separate component of the computer system 500, FSD component 570 can be stored on, e.g., the first storage device 522 and/or the second storage device 529. Alternatively, FSD component 570 can be stored on a separate storage device (not shown).

Of course, the computer system 500 may also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing face spoofing detection using a physical-cue-guided multi-source multi-channel framework, comprising:
    receiving a set of data including face recognition data, liveness data and material data associated with at least one face image;
    obtaining a shared feature from the set of data using a backbone neural network structure;
    performing, based on the shared feature, a pretext task corresponding to face recognition, a first proxy task corresponding to depth estimation, a liveness detection task, and a second proxy task corresponding to material prediction; and
    aggregating outputs of the pretext task, the first proxy task, the liveness detection task and the second proxy task using an attention mechanism to boost face spoofing detection performance,
    wherein the first proxy task generate a depth prediction together with a depth channel attention matrix, the liveness prediction task generates a liveness feature and a corresponding liveness channel attention matrix, and the material prediction task generates a liveness feature and a corresponding material channel attention matrix.

2. The method as recited in claim 1, wherein the liveness data includes depth ground truth and material ground truth prepared off-line, and the material data includes a Materials in Context (MINC) dataset.

3. The method as recited in claim 1, wherein obtaining the shared feature further includes extracting the shared feature using a shared feature extractor.

4. The method as recited in claim 1, wherein aggregating the outputs includes combining the depth channel attention matrix, the liveness channel attention matrix and the material channel attention matrix using a prediction-level attention model.

5. The method as recited in claim 1, wherein the face spoofing detection implements an overall loss design including a face recognition loss, an $l_1$-based reconstruction loss, at least one cross-entropy loss and at least one multi-class softmax loss.

6. The method as recited in claim 1, wherein the face spoofing detection is implemented within a biometric system.

7. A computer program product comprising a non-transitory computer readable storage medium having program instructions embodied therewith, the program instructions executable by a computer to cause the computer to perform a method for implementing face spoofing detection using a physical-cue-guided multi-source multi-channel framework, the method performed by the computer comprising:
    receiving a set of data including face recognition data, liveness data and material data associated with at least one face image;
    obtaining a shared feature from the set of data using a backbone neural network structure;
    performing, based on the shared feature, a pretext task corresponding to face recognition, a first proxy task corresponding to depth estimation, a liveness detection task, and a second proxy task corresponding to material prediction; and
    aggregating outputs of the pretext task, the first proxy task, the liveness detection task and the second proxy task using an attention mechanism to boost face spoofing detection performance,
    wherein the first proxy task generate a depth prediction together with a depth channel attention matrix, the liveness prediction task generates a liveness feature and a corresponding liveness channel attention matrix, and the material prediction task generates a liveness feature and a corresponding material channel attention matrix.

8. The computer program product as recited in claim 7, wherein the liveness data includes depth ground truth and material ground truth prepared off-line, and the material data includes a Materials in Context (MINC) dataset.

9. The computer program product as recited in claim 7, wherein obtaining the shared feature further includes extracting the shared feature using a shared feature extractor.

10. The computer program product as recited in claim 7, wherein aggregating the outputs includes combining the depth channel attention matrix, the liveness channel attention matrix and the material channel attention matrix using a prediction-level attention model.

11. The computer program product as recited in claim 7, wherein the face spoofing detection implements an overall loss design including a face recognition loss, an $l_1$-based reconstruction loss, at least one cross-entropy loss and at least one multi-class softmax loss.

12. The computer program product as recited in claim 7, wherein the face spoofing detection is implemented within a biometric system.

13. A system for implementing face spoofing detection using a physical-cue-guided multi-source multi-channel framework, comprising:
a memory device storing program code; and
at least one processor device operatively coupled to the memory device and configured to execute program code stored on the memory device to:
receive a set of data including face recognition data, liveness data and material data associated with at least one face image;
obtain a shared feature from the set of data using a backbone neural network structure;
perform, based on the shared feature, a pretext task corresponding to face recognition, a first proxy task corresponding to depth estimation, a liveness detection task, and a second proxy task corresponding to material prediction; and
aggregate outputs of the pretext task, the first proxy task, the liveness detection task and the second proxy task using an attention mechanism to boost face spoofing detection performance,
wherein the first proxy task generate a depth prediction together with a depth channel attention matrix, the liveness prediction task generates a liveness feature and a corresponding liveness channel attention matrix, and the material prediction task generates a liveness feature and a corresponding material channel attention matrix, and wherein aggregating the outputs includes combining the depth channel attention matrix, the liveness channel attention matrix and the material channel attention matrix using a prediction-level attention model.

14. The system as recited in claim 13, wherein the liveness data includes depth ground truth and material ground truth prepared off-line, and the material data includes a Materials in Context (MINC) dataset.

15. The system as recited in claim 13, wherein obtaining the shared feature further includes extracting the shared feature using a shared feature extractor.

16. The system as recited in claim 13, wherein the face spoofing detection implements an overall loss design including a face recognition loss, an $l_1$-based reconstruction loss, at least one cross-entropy loss and at least one multi-class softmax loss.

17. The system as recited in claim 13, wherein the face spoofing detection is implemented within a biometric system.

* * * * *